United States Patent

[11] 3,542,286

| [72] | Inventors | Bill W. Binkley<br>Medford;<br>Donald C. Lavallee, Magnolia; Carl C.<br>Spagnoli, Marlton, New Jersey |
|---|---|---|
| [21] | Appl. No. | 673,484 |
| [22] | Filed | Oct. 6, 1967 |
| [45] | Patented | Nov. 24, 1970 |
| [73] | Assignee | Said Binkley assignor to RCA Corporation,<br>a corporation of Delaware |

[54] TIMING SYSTEM FOR READOUT OF STORED DATA
7 Claims, 3 Drawing Figs.

[52] U.S. Cl. ........................................... 235/61.11;
         250/219; 178/17
[51] Int. Cl. ................................................ G06r 7/016
[50] Field of Search ............................. 235/61.115,
         .11, .12, .13; 250/219(ID); 178/17(D)

[56] References Cited
UNITED STATES PATENTS

| 3,222,501 | 12/1965 | Wood ........................ | 235/61.115 |
|---|---|---|---|
| 3,435,191 | 3/1969 | Peddle ....................... | 235/61.11 |

Primary Examiner—Thomas A. Robinson
Attorney—H. Christoffersen

ABSTRACT: A timing system for triggering the readout of stored data from a storage member by transducers responsive to the stored data which is effective to synchronize the readout operation with the sensed sequence of a plurality of timing signals derived from the storage member and related to the position of the stored data.

INVENTORS
BILL W. BINKLEY
DONALD C. LAVALLEE &
CARL C. SPAGNOLI
BY N. Christoffersen
ATTORNEY INVENTORS
BILL W. BINKLEY
DONALD C. LAVALLEE &
CARL C. SPAGNOLI
BY H. Christoffersen
ATTORNEY 3,542,286

1

TIMING SYSTEM FOR READOUT OF STORED DATA

BACKGROUND OF THE INVENTION

The conventional automatic machine reading of record members, e.g. punched tape, is achieved by the use of a plurality of energy sensitive transducers, e.g. photodiodes, arranged to sense the presence of the data holes. A source of energy, e.g. light, is provided on the other side of the record member from the transducers to direct its radiated energy to the transducers through the data holes. Thus, the presence of a data hole is signaled by a respective transducer as the result of the sensing of radiated energy from the source. The data holes are usually arranged on transverse lines across the width of the record member with each line of holes representing a data character. The number of holes for each character is determined by the particular code selected to encode the data stored on the record member, e.g., a seven hole code. A series of holes arranged on a longitudinal line on the record member with one hole on each character line is provided as a "-sprocket" or timing means. In the case of punched tape, the sprocket holes are arranged along the center of the tape and may be used by a sprocket wheel to drive the tape. Additionally, the sprocket holes are sensed by an independent transducer to provide a trigger signal for data readout since the sprocket holes are alined on the character lines.

In order to accurately read the stored data, it is desirable to read the line of data holes at the time that the center of each of the holes is above the respective transducer. Since the timing transducer used to sense the sprocket holes is capable of generating an output signal before the center of the sprocket hole is reached, the timing signal would normally be produced before the center line of data had been reached. In apparatus embodying the present invention, a second sprocket hole sensing transducer is arranged to sense a sprocket hole before and adjacent to the data line being read. A sequence of signals from the first and second sprocket hole transducers is used to produce a trigger signal for the data readout which occurs substantially at the time that the data line is centered above the data transducers.

An additional problem in the use of a punched record member is created by the presence of clogged or missing sprocket holes. This hole clogging can be caused either by dirt or by the imperfect punching of the sprocket holes. The net effect, in either case, is to prevent the normal operation of the sprocket hole transducers whereby a readout trigger signal is not produced for a line of data associated with a faulty sprocket hole. Thus, a data character, or characters, would be lost and no character would be read out until a sequence of proper sprocket holes was present on the record member. In order to overcome this problem, apparatus employing the present invention is arranged to provide an additional two sprocket hole transducers arranged to sense respective additional sprocket holes on one side of the aforesaid two sprocket holes. This arrangement is effective to read data from the record member with up to three contiguous faulty sprocket holes.

Finally, a record member wherein the data or the sprocket holes are not regularly positioned, e.g., either the number of characters per inch is greater or less than the specified number, or the sprocket holes are elongated past their normal physical size, is effective to produce a loss of data by preventing the readout timing trigger signal from coinciding with the character line on the record member. In apparatus employing the present invention, the absence of a trigger signal is monitored and a logic circuit produces a substitute trigger signal if the signals received by the sprocket hole transducers are indicative of the possibility of the presence of a character. Thus, the data character is read from the storage member even if the regular trigger signal is not produced by the aforesaid misalinement of the data holes and sprocket holes.

2

BRIEF SUMMARY OF THE INVENTION

The present invention is directed to a timing system for a stored data reader having a readout synchronizing means for initiating a readout operation when the stored data characters are alined with the readout transducers. The timing system is arranged to trigger a readout operation based on a detected sequence of timing, or sprocket holes, which are operatively related with the data characters. Further, the timing system is arranged to operate in an auxiliary timing mode when the sprocket holes are faulty and fail to produce a normal signal sequence to trigger a readout operation.

DETAILED DESCRIPTION OF THE INVENTION

Figure 1:
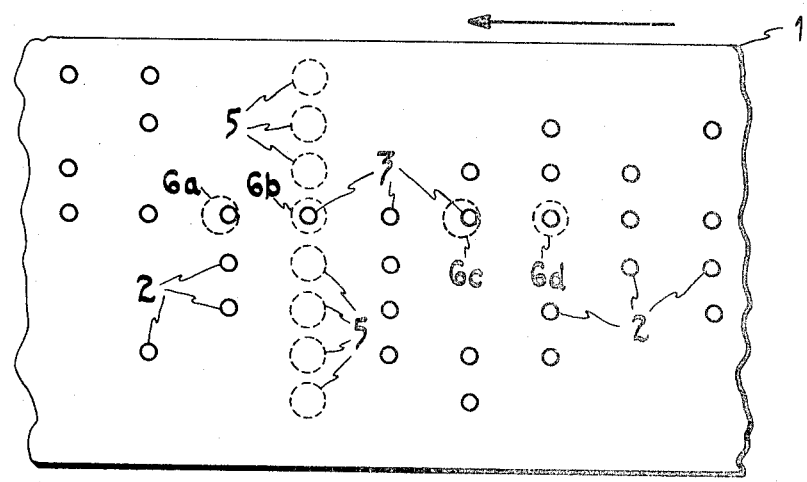
FIG. 1 is a pictorial diagram of a tape reading apparatus for use with the present invention.

In FIG. 1, there is shown an exemplary embodiment of the present invention in a punched tape reading apparatus. A punched tape 1, having data stored therein as data holes 2 and a longitudinal row of regularly spaced sprocket holes 3, is shown as an example of a record tape. The data holes 2 are arranged along lines transverse to the row of sprocket holes and alined with the sprocket holes 3 across the tape 1 in a seven hole code with each line storing a coded character. Seven data sensing transducers 5 are positioned in a line beneath the tape 1 with each one being arranged in an operative relationship with a location for a respective data hole comprising a stored character. A source of energy, not shown, is positioned on the other side of the tape 1 from the transducers 5 to transmit energy to the transducers 5 upon the occurrence of a hole in the tape 1 between the aforesaid source and the transducers 5.

Similarly, four sprocket hole sensing transducers 6a, 6b, 6c and 6d are positioned in an operative relationship with four of the sprocket holes 3 in the tape 1. Specifically, the sprocket hole transducers 6a to 6d are arranged to sense the sprocket hole in the line before the character being read, the sprocket hole at the character being read and the second and third sprocket holes after the character being read, respectively. In other words, the first sprocket hole after the character being read is not sensed by a sprocket hole transducer. The sprocket hole transducers 6a to 6d are also associated with a source of energy positioned on the other side of the tape 1 therefrom, which source may be the same source previously mentioned for the data transducers 5. In the exemplary system shown in FIGS. 1 and 2, the transducers 5 and 6a to 6d are photodiodes and the energy source therefor would be a light source. The motion of the tape 1 is in the direction indicated by an arrow in FIG. 1.

As shown in FIG. 1, the sprocket hole transducers 6a to 6d are not evenly spaced. Specifically, the first transducer 6a is displaced from transducer 6b, in the direction of motion of the tape 1, by a distance which allows the sprocket hole corresponding to the character being read to reach a position over its associated transducer 6b before the sprocket hole ahead of the character being read reaches its associated first transducer 6a. In other words, the first transducer 6a is displaced from the second transducer 6b by a distance greater than the separation between the sprocket holes. Similarly, the third transducer 6c is displaced from the fourth transducer 6d in the direction of tape motion by a distance greater than the sprocket hole separation. Thus, the second and fourth transducers 6b and 6d are effective to produce an output signal before the first and third transducers 6a and 6c.

Figure 2:
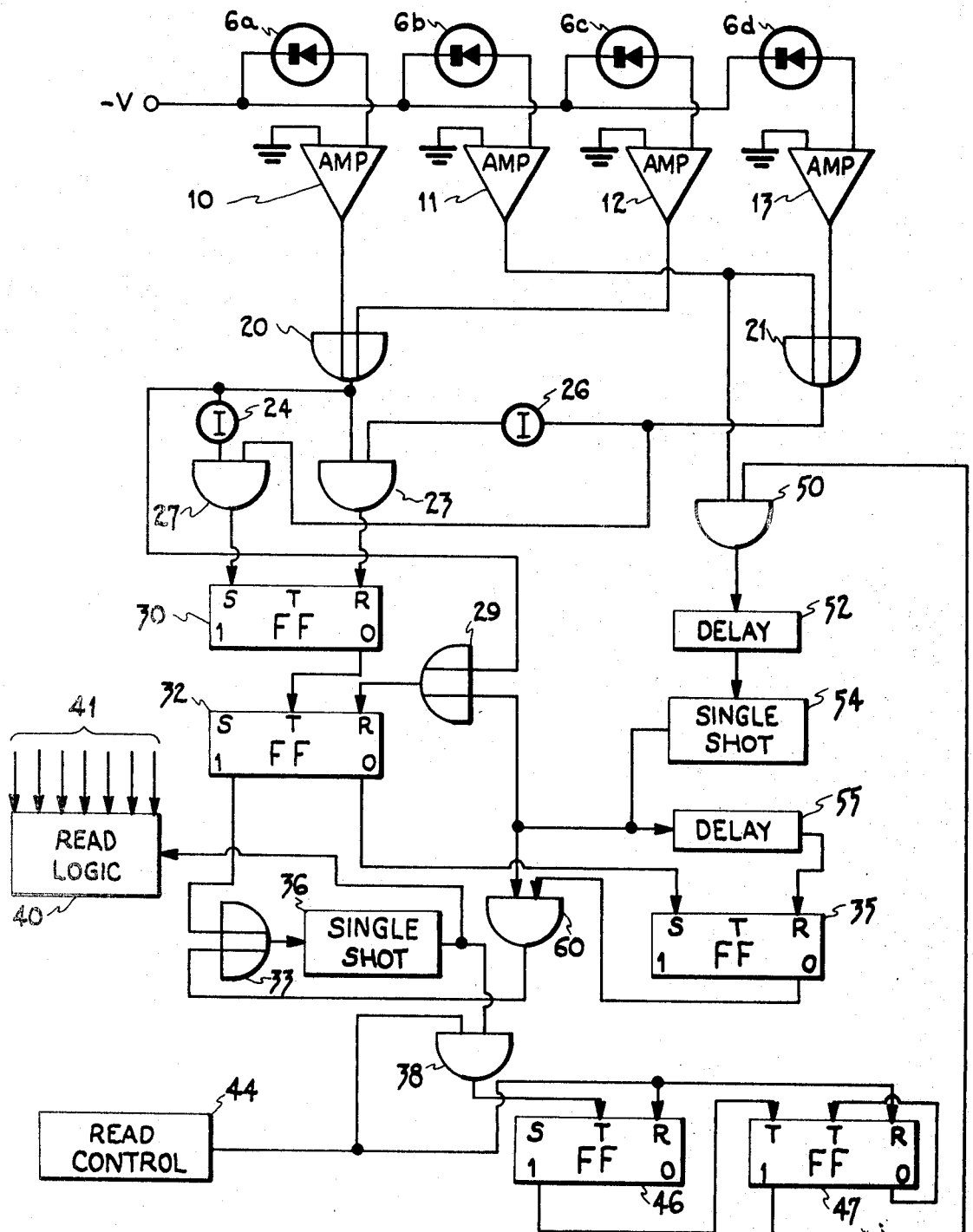
FIG. 2 is a diagram of a logic system suitable for use with the present invention.

In FIG. 2, there is shown a logic diagram of an example of a timing system embodying the present invention and utilizing the output signals from the sprocket hole sensing transducers 6a to 6d, shown in FIG. 1. The transducers 6a to 6d are shown also in FIG. 2 with exemplary photodiodes being illustrated as transducer elements. These photodiodes are each connected between a source -V and a respective one of a plurality of amplifiers 10, 11, 12 and 13. The outputs from the amplifiers 10 to 13 are arranged in a first and a second pair with the output from the first and third amplifiers 10, 12 forming the first pair, and the remaining two amplifier outputs forming the second pair. It is to be noted at this point that the signals at the first pair of outputs represent the output signals from the displaced pair 6a, 6c of the transducers 6a to 6d described above. The first pair of signal levels is applied to a first OR gate 20 and the second pair to a second OR gate 21. The output signals from the OR gates 20 and 21 are applied to a logic circuit to produce the timing control signal for reading out a character on the storage tape 1 in a manner hereinafter more fully described. The output signal from the first OR gate 20 is applied to a first AND gate 23, to a first signal inverter 24 and to a third OR gate 29. The output signal from the second OR gate 21 is applied to a second signal inverter 26 and to a second AND gate 27. The output signal from the first inverter 24 is applied as a second input signal to the second AND gate 27. The output from the second inverter 26 is applied as a second input signal to the first AND gate 23.

The output signal from the first AND gate 23 is applied to the "reset" input of a first flip-flop 30 while the output signal from the second AND gate 27 is applied to the "set" input of the first flip-flop 30. The "O" output signal from the first flip-flop 30 is applied to the "trigger" input of a second flip-flop 32 to change the state thereof for each input signal from the first flip-flop 30. An output signal from the first OR gate 20 is applied to the "reset" input of the second flip-flop 32 via OR gate 29. An output signal level from the "1" side of the second flip-flop 32 is applied to a fourth OR gate 33 while the "O" side signal level is applied to the "set" input of a third flip-flop 35. The output signal from the fourth OR gate 33 is applied to a first "single-shot", or monostable multivibrator, 36. The output signal from the first "single-shot" 36 is applied to a third AND gate 38 and also is used as the "read" timing, or trigger, signal, for a read logic 40 having seven input lines 41 which are connected to respective ones of the character transducers 5. The read logic 40 may be any suitable logic circuit for receiving, storing and reading out the signals from the transducers 5, such circuits being well known in the art.

The foregoing section of the logic circuit of FIG. 1 may be described as the "direct control" portion inasmuch as it generates the "read" timing in response to a sequence of output signals from the sprocket hole transducers 6. The remainder of the logic circuit of FIG. 2, on the other hand, may be described as an "auxiliary control" since it functions during a time when the "direct control" portion is disabled by the presence of faulty sprocket holes.

A "read" control circuit 44, e.g., an operator actuated pushbutton, a computer control signal, etc., is arranged to supply an input signal to the logic circuit of FIG. 2 for a purpose which is more fully described hereinafter. This input signal is applied as a second input signal to the third AND gate 38 and as a "reset" signal to a fourth flip-flop 46 and a fifth flip-flop 47. The output signal from the third AND gate 38 is applied to the trigger input on the fourth flip-flop 46. The "1" side of the fourth flip-flop 46 is connected to a first trigger input of the fifth flip-flop 47. The "O" side of the fifth flip-flop 47 is connected in a self-latching feedback loop to a second trigger input of the fifth flip-flop 47. The "one" side of the fifth flip-flop 47 is arranged to apply a first input signal to a fourth AND gate 50.

A second input signal for this AND gate 50 is derived from the second amplifier 11 which is amplifying the signal from the second sprocket hole transducer 6b located on the character line to be read. An output signal from the fourth AND gate 50 is applied to a first delay 52. The output signal from the delay 52 is applied to a second single-shot 54 which is effective to provide an output signal which is applied to a second delay 55, as a second input signal for the third OR gate 29 and as a first input signal for a fifth AND gate 60. An output signal from the second delay 55 is used as a "reset" signal for the third flip-flop 35. A second input signal for the fifth AND gate 60 is derived from "O" side of the third flip-flop 35. The output signal from the fifth AND gate 60. is applied as a second input signal to the fourth OR gate 33 which is effective to complete the interconnection between the direct control portion and the auxiliary control portion of the logic circuit of FIG. 2 since the output signal from the OR gate 33 is effective to produce the trigger, or strobe, signal for the "read" logic 40, as previously described.

In operation, the present invention is effective to develop a timing signal for the "read" logic 40 to trigger the transfer of stored information from the storage tape 1 to the read logic 40 via the input lines 41. Thus, the character transducers 5 would be sampled for their output signals during the occurrence of a timing signal which signal is arranged to occur during the time that the character information is alined with the transducers 5, e.g., the character holes 2 are centered over the character transducers 5. This timing signal is developed from the outputs of the sprocket transducers 6a to 6d. Specifically, the output signals from the first amplifier 10 and the third amplifier 12 representing amplified signals from the first and third transducers 6a and 6c, respectively, are applied to the first OR gate 20.

An output signal from this OR gate 20 representing the presence of either the output signal from the first amplifier 10 or the third amplifier 12 is directly applied as a first enabling input signal to the first AND gate 23 and is applied through the first inverter 24 as a first input signal to the second AND gate 27. Similarly, the output signals from the second and fourth amplifiers 11, 13 representing amplified signals from the second and fourth transducers 6b and 6d, respectively, are applied to the second OR gate 21. The output signal from this OR gate 21 is directly applied as a second enabling input signal to the second AND gate 27 and is applied through the second inverter 26 as a second input signal to the first AND gate 23. The inverters 24 and 26 are effective to produce a logical inversion of their input signals whereby their output signals appear to be gate enabling signals from the corresponding OR gates when these OR gate signals are not present and vice versa. Thus, the first AND gate 23 is provided with a first enabling input signal from the first OR gate 20 representing an actual signal from either the first or third transducer 6a and 6c while the second enabling input signal to the AND gate 23 is present when the output signals from the second and fourth transducers 6b and 6d are missing. This condition may be symbolically represented using X for the signals from either the first or third transducers 6a and 6c, respectively and Y for the signals from the second and fourth transducers 6b and 6d, respectively, as $X\overline{Y}$. On the other hand, the enabling inputs to the second AND gate 27, using the aforesaid definitions are $\overline{X}Y$.

The previously described offset in the direction of motion of the tape 1, shown in FIG. 1, of the first and third sprocket hole transducers 6a and 6c is effective to produce a delay in the output signals from these transducers. Thus, the "X" signal is delayed relative to the "Y" signal. If the sprocket holes are all present over the particular length of tape being read, $\overline{X}Y$ combination occurs first and enables the second AND gate 27 to produce an output signal to set the first flip-flop 30 to the "1" state. Since this flip-flop 30 is normally in the "O" state, as described hereinafter, this change to the "1" state will trigger the second flip-flop 32 to the "1" state. This flip-flop 32 is also normally in the "O" state, as hereinafter explained.

When the leading edge of the signal from either the first sprocket hole transducer 6a or the third transducer 6c does appear, it is effective to terminate the enabling output signal from the inverter 24 applied to the second AND gate 27. Further, it is applied to the third OR gate 29 to produce an output signal therefrom. This output signal is arranged to reset the second flip-flop 32 to the "0" state. In response thereto, the fourth OR gate 33 produces an output signal level which is operative to trigger the single-shot 36 to produce an output signal pulse having a predetermined 100μ sec duration. This signal pulse is applied to the "read" logic 40 to produce a readout of the data character which at this time is centered over the character transducers 5, shown in FIG. 1.

Since the signals from the second and fourth transducers 6b and 6d are produced ahead of the first and third transducer signals, they are also terminated before the latter signals. This condition is produced by the trailing edge of the sprocket holes leaving the active area of the second and fourth transducers 6b and 6d. The termination of the signals from the second and fourth transducers is effective to produce the signal combination identified above as $\overline{X}\overline{Y}$. This signal combination is effective to produce an output signal level from the first "AND" gate 23 to "reset" the first flip-flop 30 to the "0" state. Thus, at the end of a normal sequence of sprocket holes, the first and second flip-flops 30 and 32 are in a "0" state and the logic is ready to respond to a new sequence of signals from the sprocket hole transducers. This sequence of operation is identified as the "direct control" and is shown in the first five waveshapes of FIG. 3. Thus, waveshapes A to D are the output signals from the sprocket hole transducers 6a and 6d, respectively, while the waveshape E is the data readout trigger, or "-strobe" signal.

Since the aforesaid sequence is independent of which of the two pairs of signals is present, i.e., the signal from either the first or third transducer 6a and 6c and the signal from either the second or fourth transducer 6b or 6d will produce the logic sequence of $\overline{X}Y$ and $\overline{X}\overline{Y}$, it may be seen that some of these sprocket holes may be faulty without affecting the data trigger signal. Further, since a sprocket hole is skipped between the second and third transducers 6b and 6c, it may be seen that three contiguous sprocket holes may be blocked without affecting the logic sequence since any combination of three sprocket holes in the group of five holes located in the sprocket hole transducer zone will include the skipped hole. Thus, the direct control logic is able to operate in the presence of a number of successive faulty sprocket holes.

If more than the maximum number of faulty successive sprocket holes are present, the above-described direct control circuit will be retained at some intermediate step in the logic sequence until the proper combination of signals is again received from the sprocket hole transducers 6a and 6d. During this time, the rest of the logic circuit of FIG. 2 is available to function as an auxiliary control to force a data readout trigger signal to be generated by the single-shot 36. The auxiliary control logic is controlled by the output signal from the second sprocket hole transducer 6b which is alined with the data character to be read. The presence of this transducer signal is an indication that a data character is ready to be read and a data readout signal should be generated. However, the auxiliary control is further controlled by the presence of two additional signals. One of these signals is obtained from the read control means 44 which is effective to allow the auxiliary control to operate if a readout is actually desired, e.g., during the time that the tape 1 is in motion past the reading station. This read control signal is applied to the third AND gate 38 in combination with the second of the aforesaid signals which is a readout trigger signal obtained from the single-shot 36 during the prior operation of the direct control logic previously described. These two enabling signals are effective to produce an output signal from the AND gate 38 which is applied to the "trigger" input of the fourth flip-flop 46 to set this flip-flop to the "1" state. A second trigger signal and read control signal combination is later applied to the AND gate 38 to again trigger the flip-flop 46. This second change of state of the flip-flop 46 is effective to trigger the fifth flip-flop 47 to the "1" state.

The output level from the "1" side of the fifth flip-flop 47 is applied to the fourth AND gate 50 in combination with the signal from the second sprocket hole transducer 6b. When the fifth flip-flop 47 is in the "1" state, the AND gate 50 is arranged to receive two enabling input signal levels to produce an output signal. This output signal is delayed by 300μ sec in the delay circuit 52 and is applied as a trigger signal to a second single-shot 54. The second single-shot 54 is effective to produce a 3μ sec pulse at this time which is 300μ sec after the start of the output signal from the second sprocket hole transducer 6a. The 3μ sec pulse is delayed by the second delay 55 and is subsequently used to reset the third flip-flop 35. The additional effect of this 3μ sec pulse will depend on the state of the direct control logic. For example, if the second flip-flop 32 was not reset by a signal from either the first or third transducer 6a or 6c, then the 3μ sec pulse is effective to reset this flip-flop 32 to generate the readout trigger signal from the first single-shot 36, as previously described.

Figure 3:
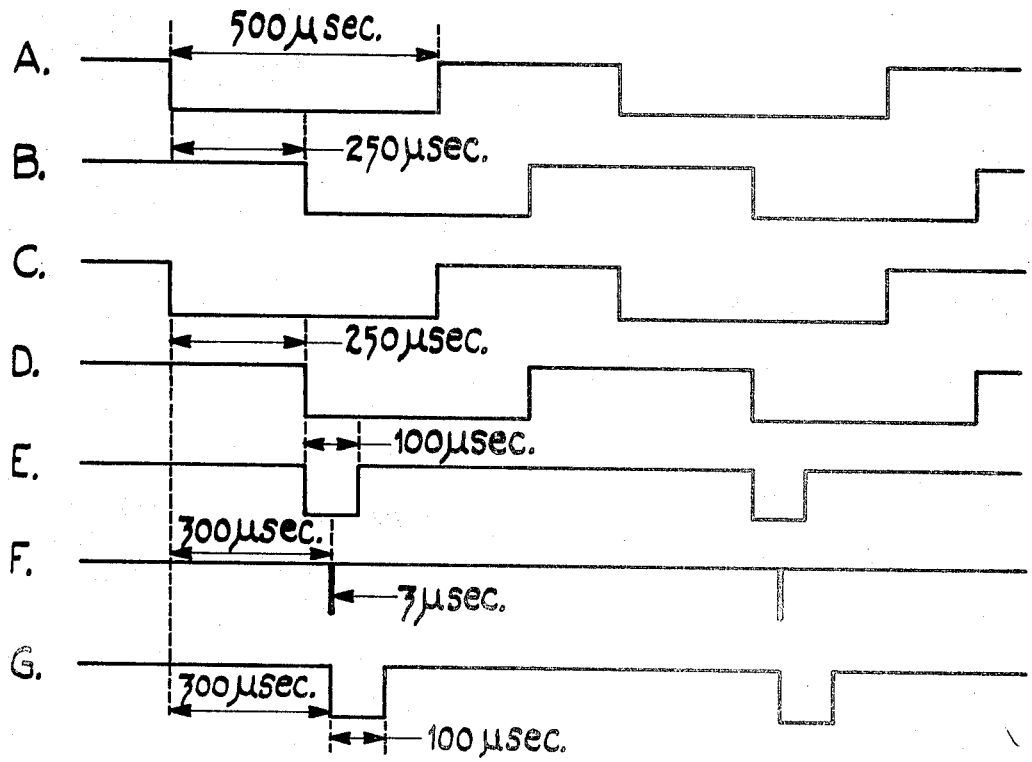
FIG. 3 is a waveshape diagram of the signals occurring in the logic system shown in FIG. 2.

On the other hand, if this flip-flop 32 was not set by the first flip-flop 30, then the third flip-flop 35 will be in a "set" state since the "0" side of the second flip-flop 32 is connected to the "set" side of the third flip-flop 35. Since the "0" side of the third flip-flop 35 is connected to an input of the fifth AND gate 60, this gate is enabled by the 3μ sec pulse, and a gate output signal is applied to the fourth OR gate 33 to trigger the single-shot 36 to supply the readout trigger signal. The third flip-flop 35 is later reset by a signal from the second delay 55. The auxiliary control is inhibited from executing the above operation when the signal from the read control means 44 is terminated since this change in signal level is effective to reset the fourth and fifth flip-flops 46 and 47, whereby the fourth AND gate 50 is closed to the signals from the second sprocket hole transducer 6b. The waveshapes F and G in FIG. 3 show the 3μ sec signal and the resulting delay 100μ sec readout trigger signal, respectively. Thus, the auxiliary control logic is effective to produce a character readout when the direct control logic is temporarily disabled.

We claim:

1. A reading apparatus for reading recorded information characters from a storage member comprising a first timing logic circuit responsive to presentation at said apparatus of a sequence of a plurality of timing indices on the storage member to generate a readout trigger signal, and a second timing logic circuit responsive to one of said plurality of indices controlling said first timing circuit and to the operation of said first timing circuit to generate said trigger signal after a predetermined period from the time of operation of said first timing circuit, said second timing circuit being inhibited from generating said trigger signal upon the operation of said first timing circuit to generate said trigger signal.

2. A reading apparatus as set forth in claim 1, wherein said one of said plurality of indices is alined with a recorded character being read from said storage member.

3. A reading apparatus as set forth in claim 2, wherein said first timing logic is responsive to a first timing indice positioned ahead of a recorded character being read from said storage member, to a second timing indice which is alined with said recorded character being recorded, to a third timing indice displaced by one character space from said character being read and to a fourth timing indice following said third indice.

4. A reading apparatus as set forth in claim 3, wherein said first timing logic circuit includes a first means responsive to either said first or said third indices and a second means responsive to either said second or said fourth indices.

5. A reading apparatus as set forth in claim 3, and including a first transducer means arranged to respond to said first indice, a second transducer means arranged to respond to said second indice, a third transducer means arranged to respond to said third indice, a fourth transducer means arranged to respond to said fourth indice.

6. A reading apparatus as set forth in claim 5, wherein each of said first, second, third and fourth transducer means have a light source and a photo-responsive element with the timing indice being effective to vary the light from said source incident on said element.

7. A reading apparatus as set forth in claim 4, wherein said second timing logic circuit is operative if either said first means or said second means have failed to respond to their respective timing indices.